United States Patent [19]

Nemoto

[11] Patent Number: 4,781,779
[45] Date of Patent: Nov. 1, 1988

[54] METHOD OF MANUFACTURING TRIM COVER ASSEMBLY FOR VEHICLE SEATS

[75] Inventor: Akira Nemoto, Akishima, Japan

[73] Assignee: Tachi-S Co., Ltd., Akishima, Japan

[21] Appl. No.: 102,337

[22] Filed: Sep. 29, 1987

[51] Int. Cl.$^4$ .................. B32B 31/20; B32B 31/22
[52] U.S. Cl. ................... 156/219; 156/274.4; 156/298; 156/299; 156/303.1; 156/379.9; 156/380.6; 156/380.8
[58] Field of Search .............. 156/219, 265, 274.4, 156/298, 299, 303.1, 273.7, 272.2, 380.8, 379.9, 380.6

[56] References Cited

U.S. PATENT DOCUMENTS

| | | | |
|---|---|---|---|
| 2,330,497 | 9/1943 | Larmour | 156/298 |
| 2,706,165 | 4/1955 | Korsgaard | 156/379.9 |
| 3,454,457 | 7/1969 | Hale et al. | 156/219 |
| 4,042,433 | 8/1977 | Hardy et al. | 156/298 |

Primary Examiner—Michael Wityshyn
Attorney, Agent, or Firm—Oldham & Oldham Co.

[57] ABSTRACT

A method of manufacturing a trim cover assembly for a vehicle seat, in which a decorative strip preformed in a predetermined shape and a substrate are pressed and heated together by upper and lower dies of a high frequency wave welding apparatus, while a high frequency wave is applied thereto. The upper die has a working surface larger than the decorative strip and formed with a fine crimp and fine irregularity. Thus, the decorative strip is welded integrally to the substrate on the same level, to thereby produce a greatly advantageous and aesthetic trim cover assembly.

4 Claims, 2 Drawing Sheets

METHOD OF MANUFACTURING TRIM COVER ASSEMBLY FOR VEHICLE SEATS

BACKGROUND OF THE INVENTION

1. Field of the Invention

The present invention relates to a method of manufacturing a trim cover assembly covering the surfaces of vehicle seats, and in particular relates to a manufacturing method for the trim cover assembly in which a decoration, such as a letter or pattern, is applied to the surface of the trim cover assembly by means of high frequency wave welding method.

2. Description of Prior Art

Improvement on aesthetic effect for vehicle or automobile seats has been done by application of a decorative material, such as letters, or patterns, to the surface of a trim cover assembly. In most instances, conventional methods for effecting such decoration process, are based on either of the undermentioned ways:

Firstly, as shown in FIG. 1 of the accompanying drawings, there has been employed a printing method which includes a roll leaf hot stamping method or silk screening method in order to apply a decorative material to a surface of trim cover assembly (1a). Hereinafter, the surface of trim cover assembly shall be referred to as a substrate for simplicity sake. In this case, the decorative material is an ink (1b), and any desired decorative patterns or letters, with a multiplicity of colors, can be provided in a vivid fashion on the substrate (1a), without damage thereon. However, because of the ink (1b) being merely applied on the substrate (1a), a long period of wear causes abrasion of the ink (1b) and results in the impairment of the good-looking seat.

Secondly, as indicated in FIG. 2(A), a film of decorative material (1c) is placed on and welded to the substrate (1a) at a given welding area, at which time, simultaneously, the non-welded area thereof is cut off, so that the welded area of the film (1c) is left on the substare (1a), representing a decorative image thereupon. In this prior art method, an upper die (a') used is of such construction that its working surface is formed in conformity with a desired decorative image, and a projected blade (a'1) is provided in a manner surrounding the woring surface. Therefore, during the processes, the film (1c) is cut in a predetermined contour and welded integrally with the substrate (1a), as seen in FIG. 2(B). The advantage is indeed found in no possibility of wear in regard to the decorative film (1c). However, the use of such intricate die (a'), which needs to be formed solely for each different desired images, increases costs involved. The blade (a'1) on the die (a') gives a flaw to the substrate (1a), which reduces the use life of the substrate (1a) (for example, a synthetic leather). Further, as the film (1c) is cut by the blade (a'1), it is highly possible that a burr will be created at the edges of the film (1c) and from such burr, the film (1c) will be peeled off.

SUMMARY OF THE INVENTION

In view of the above-mentioned drawbacks of conventional method, it is therefore a purpose of the present invention to provide an improved method of manufacturing a trim cover assembly, in which a desired decoration, such as letters or patterns, is applied to a surface of the trim cover assembly without any damage, and thus, eliminated is the possibility of wear in regard to the applied decoration.

To attain the above purpose, the present invention is based upon the steps of:

(a) placing a preformed decorative strip on a substrate, namely, a trim cover assembly;

(b) mounting such lamination onto a high frequency wave welding apparatus which has a die whose working surface is larger than the decorative strip and further is formed with a fine crimp or fine irregularity; and (c) heating and pressing the lamination while applying a high frequency wave thereto simultaneously, by operating the apparatus, to thereby weld the decorative strip integrally to the trim cover assembly.

Consequently, an uneven decorative image or pattern is formed at the decorative strip in the substrate as well as the area of the substrate surrounding or adjacent to the decorative strip. Moreover, the decorative strip is disposed within the substrate, with the top surface of the former being flush with that of the latter.

BRIEF DESCRIPTION OF THE DRAWINGS

FIG. 2(B) is a sectional view of a product made by the method in the FIG. (A);

DETAILED DESCRIPTION OF PREFERRED EMBODIMENTS OF THE INVENTION

Figure 1:
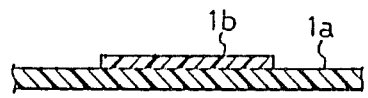
FIG. 1 is a sectional view of a trim cover assembly manufactured in accordance with a conventional method.
Figure 2:
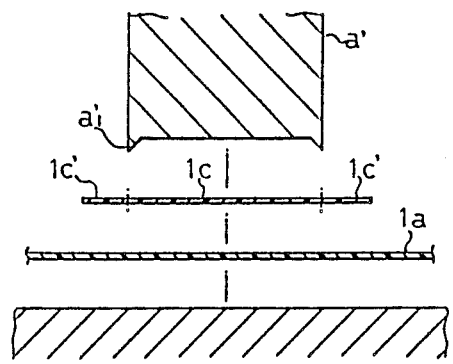
FIG. 2 (A) is a sectional view which explanatorily shows a process of manufacturing a trim cover assembly in accordance with another conventional method.
Figure 2:
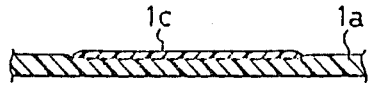
Figure 3:
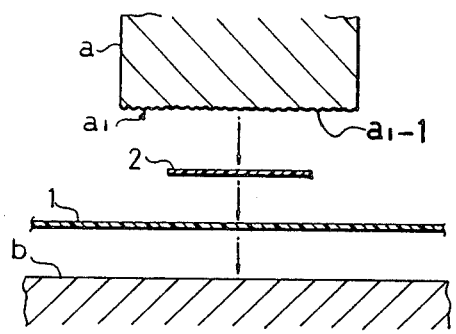
FIG. 3 is a sectional view which explanatorily shows the steps of manufacturing a trim cover assembly in accordance with the present invention method, prior to a welding step.

Referring to FIG. 3, designation (1) stands for a substrate. This substrate refers to a trim cover assembly commonly used for vehicles or automobiles, which is formed of a thermoplastic synthetic resin (for example, a leather or cloth of vinyl chloride) Designation (2) denotes a decorative strip. The decorative strip (2) is made of a thermoplastic synthetic resin having a high compatibility with the substrate (1), so preferably made of a film of vinyl chloride, and formed in a predetermined shape (letter pattern and so forth) by a die cutting method.

Reference character (a) represents an upper die of a high frequency wave welding apparatus. The upper die (a) has a working surface (a1) so formed that it is larger than the outer contour of the decorative strip (2) and in its entire surface formed with a fine crimp or fine irregularity (a1-1). In operation, the upper die (a) is heated at the temperature of 150 to 200 centigrade degrees by means of a heating device (not shown).

Reference character (b) represents a lower die whose working surface is formed flat and smooth.

Now, description will be given for the steps of effecting the present invention method, with reference to FIGS. 4 to 6.

Figure 4:
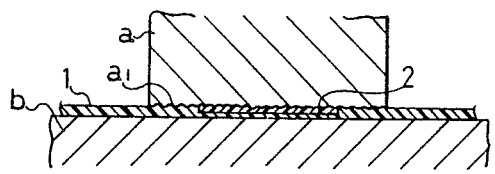
FIG. 4 is a sectional view showing the state in which a welding step is being effected.

As shown in FIG. 4, at the first stage, the substrate (1) is placed on the lower die (b). Then, the decorative strip (2) performed in a desired shape (the illustrated one is of T-shaped configuration) is laminated on the substrate (1).

Thereafter, the upper die (a) is lowered to reach such lamination on the lower (a), with care being paid to ascertain no dislocation of the lamination out of the upper and lower dies (a)(b). Then, pressure and heat is applied through the operation of the welding apparatus to both decorative strip (2) and substrate (1), while at the same time, a high frequency wave is being applied thereto.

Figure 5:
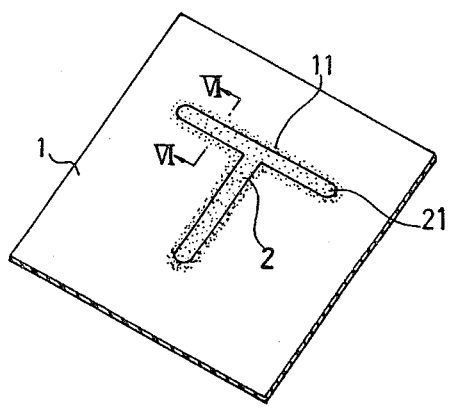
FIG. 5 is a partial perspective view of a trim cover assembly produced in accordance with the present invention method.
Figure 6:
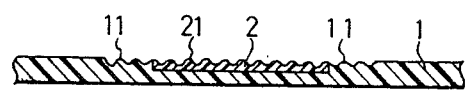
FIG. 6 is an enlarged sectional view taken along the line VI—VI in the FIG. 5.

At the completion of the foregiong high frequency wave welding process, the upper die (a) is raised from the lower die (b), whereupon the decorative strip (2) is integrally welded to the substrate (1), with a first fine uneven pattern (11) produced on the area of substrate (1) surrounding the decorative strip (2) and a second fine uneven pattern (21) produced continuously from the first one (11) on the top surface of the decoratve strip (2), as shown in FIGS. 5 and 6.

In the present embodiment, the first fine uneven pattern (11) is arranged on the area of substrate (1) adjacently surrounding the decorative strip (2) but it may be arranged on the entire area of substrate (1), by forming the upper die (a) for that purpose.

It will be appreciated in accordance with the present invention that the top surface of the decorative strip (2) is flush with that of the substrate (1), giving the appearance of the decorative strip (2) being formed on the same level with the substrate (1).

A plurality of different colored decorative strips may be arranged on the substrate (1). In this case, a desired number of different colored strips are obtained by a die cutting method or other suitable method, and then are laminated on the substrate (1) where appropriate, after which steps, the laminated elements are subjected to the above-described welding steps.

With the above-discussed steps, in accordance with the present invention, the undermentioned advantageous effects are attained.

(1) During the high frequency wave welding process, since both decorative strip (2) and substrate (1) are heated by the upper die (a), they are softened to a degree enough to facilitate their mutual weldability, and in addition thereto, the decorative strip (2) is then pressed by the upper die (a) against the substrate, so that the entirety of the strip (2) is disposed within the substrate (1) as if it was embedded in the substrate (1). Thus, the decorative strip (2) is welded integrally to the substrate (1) such that the former is not projected from the surface of the latter, and accordingly, there is eliminated the possibility that the strip (2) will be peeled from the substrate (1).

(2) The problem of damage to the substrate as in the conventional method stated above is avoided.

(3) The provision of the fine uneven crimp or fine irregularity on the upper die (a) as well as the working surface of the upper die (a) being larger than the decorative strip (2) help to assuredly prevent the projection of the strip (2) from the surface of the substrate (1). Hence, the decorative strip (2) will not be felt by an occupant sitting on the seat manufactured by the present invention, and no strange feeling will be given to him or her.

(4) A variety of different colored and different shaped decorative strips can be integrally welded to the substrate, namely, a trim cover assembly, thereby allowing the production of an exceptionally beautiful trim cover assembly.

What is claimed is:

1. A method of manufacturing a trim cover assembly for vehicle seats, comprising the steps of:

placing a thermoplastic substrate on a lower die of a high frequency wave welding apparatus;

placing a thermoplastic decorative strip preformed in a predetermrined shape, upon said substrate placed on said lower die;

thereafter, lowering an upper die of said high frequency wave welding apparatus, said upper die having a working surface larger than said decorative strip and formed with a fine crimped irregularity, so as to reach said laminated decorative strip and substrate; and applying pressure and heat via said upper die to said decorative strip and substrate while a high frequency wave is applied thereto via said upper die, whereby said decorative strip is integrally welded to said substrate in a configuration wherein upper surfaces of said decorative strip and said substrate lie in the same plane.

2. The method as defined in claim 1, wherein said lower die of said high frequency wave apparatus is formed flat and smooth in its working surface.

3. The method as defined in claim 1, wherein said decorative strip comprises a single film of synthetic resin.

4. The method as defined in claim 1, wherein said decorative strip comprises a plurality of different colored films disposed in a single plane.

* * * * *